(12) United States Patent
Conour

(10) Patent No.: US 10,851,921 B1
(45) Date of Patent: Dec. 1, 2020

(54) RACKING ARM

(71) Applicant: Shawn Michael Conour, Winton, CA (US)

(72) Inventor: Shawn Michael Conour, Winton, CA (US)

( * ) Notice: Subject to any disclaimer, the term of this patent is extended or adjusted under 35 U.S.C. 154(b) by 239 days.

(21) Appl. No.: 16/121,543

(22) Filed: Sep. 4, 2018

Related U.S. Application Data

(60) Provisional application No. 62/578,520, filed on Oct. 29, 2017.

(51) Int. Cl.
*F16L 23/16* (2006.01)
*F16K 31/44* (2006.01)

(52) U.S. Cl.
CPC ............. *F16L 23/16* (2013.01); *F16K 31/44* (2013.01); *C12G 2200/25* (2013.01)

(58) Field of Classification Search
CPC . F16L 23/16; F16L 23/12; F16L 23/18; F16L 23/167; F16L 5/00; F16L 5/04; F16L 5/02; F16L 5/025; F16L 5/08; F16L 5/14; F16L 5/022; F16K 31/44; C12G 2200/25; C12G 1/0206; C12M 23/06; C12M 23/02; C12C 13/10; C12C 11/006; C12C 11/075
USPC .......................... 251/340, 341, 343, 345, 144
See application file for complete search history.

(56) References Cited

U.S. PATENT DOCUMENTS

| | | | | |
|---|---|---|---|---|
| 3,135,293 A | * | 6/1964 | Hulsey | F16K 5/0421 137/625.31 |
| 3,374,726 A | * | 3/1968 | Sho | C12C 11/006 99/275 |
| 3,407,121 A | * | 10/1968 | Wilson | C12C 11/006 435/301.1 |
| 5,311,811 A | * | 5/1994 | Kuzyk | C12G 1/0206 210/242.1 |
| 5,906,151 A | * | 5/1999 | Firestone | C12H 1/22 426/11 |
| 9,598,665 B1 | | 3/2017 | Barnum | |

* cited by examiner

*Primary Examiner* — Umashankar Venkatesan
*Assistant Examiner* — Andrew J Rost
(74) *Attorney, Agent, or Firm* — Richard A. Ryan

(57) ABSTRACT

A racking arm having a barrel arm, a tubular control valve mounted to a tank, a tubular barrel connected to the barrel arm and rotatably positioned in a valve body of the control valve and a handle attached to the barrel to rotate the barrel. Rotating the barrel rotates the barrel arm, the distal end of which is in the tank, to allow the user to selectively position an opening at the distal end of the barrel arm to place liquid in or take liquid out of the tank without disturbing solids at the bottom of the tank. Bearings and O-rings between the valve body and barrel allow sealed rotation of the barrel. The handle extends through a slot in the valve body. The slot defines the amount of allowed rotation. A pin through the valve body engages the barrel to position and hold the barrel inside the valve body.

20 Claims, 10 Drawing Sheets

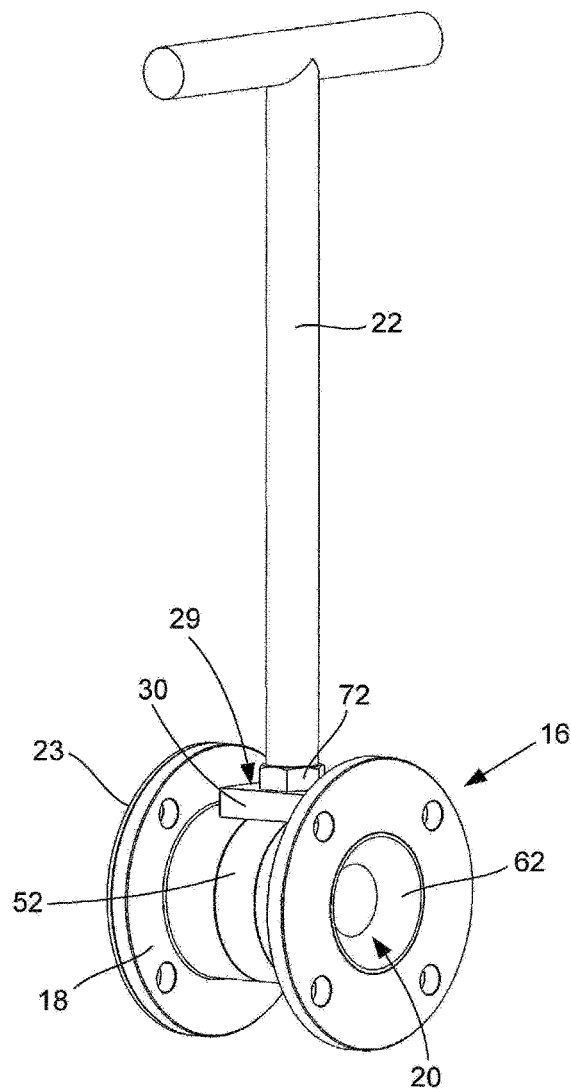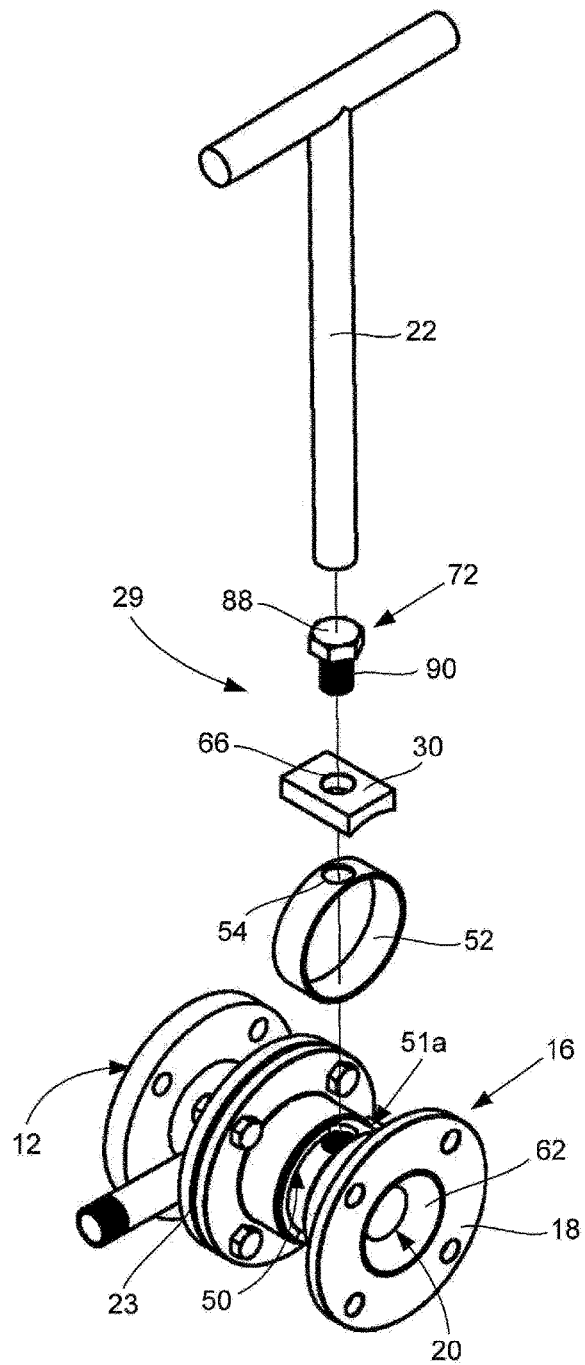
FIG. 7
FIG. 8

RACKING ARM

CROSS-REFERENCE TO RELATED APPLICATIONS

This patent application claims priority to U.S. Provisional Patent Application No. 62/578,520 filed Oct. 29, 2017.

STATEMENT REGARDING FEDERALLY SPONSORED RESEARCH

Not Applicable.

REFERENCE TO A SEQUENCE LISTING, A TABLE OR A COMPUTER PROGRAM LISTING APPENDIX SUBMITTED ON A COMPACT DISC

Not Applicable.

BACKGROUND OF THE INVENTION

A. Field of the Invention

The present invention generally relates to liquid holding tanks having a racking arm and the various ports, valves and associated piping that are utilized with such tanks. More particularly, the present invention relates to such ports and valves that are configured to allow the user to rotate a tube inside a liquid holding tank in order to pull liquid from different levels inside the tank and, if desired, to better circulate or mix the liquid in the tank. Even more particularly, the present invention relates to such outlet ports and valves that allow the racking arm and a majority of the associated valve components to remain stationary while the tube inside the tank is rotated.

B. Background

A wide variety of different types of processes require the storage of liquids in a liquid holding tank made up of a plurality of walls that define an interior area in which the liquid is stored. One type of process that requires the storage of liquid in a holding tank, but by no means the only such process, is the storage of liquids utilized in the agricultural processing industry to process a harvested crop into specific food or liquid products that will be consumed by people. Because the products will be consumed by humans, the interior components of these holding tanks and the equipment that will be in contact with the liquid are required to be made out of, or at least be covered or coated with, a food grade material, such as stainless steel and the like. As also well known, the storage of such liquids in a holding tank nearly always results in solids in the liquid settling to the bottom of the tank. These settled solids are typically an unwanted by-product of the liquid processing, at least with regard to the final produced liquid. When the final liquid product is pulled from the processing/holding tank, it is usually desirable to pull the liquid from the tank without disturbing the settled solids to prevent the solids from mixing with the liquid.

One example of the use of liquid holding tanks to store liquid as part of the process of converting an agricultural crop into a consumable product is the production of wine grapes into wine. As well known in the wine industry, juice from grapes is turned into wine through a process referred to as fermentation, which involves placing the grape juice into a holding tank at the correct temperature and allowing yeast, which was originally on the grapes (as well as mold and bacteria), to turn the sugar in the juice to alcohol and carbon dioxide. As such, the holding tank must be configured to allow grape juice to be placed in the tank and to allow the wine to be removed from the tank. During the fermentation process, solids in the grape juice will settle out of the juice and collect on the bottom of the tank. When the wine is removed from the tank, it is important not to disturb the solids at the bottom of the tank or to pull out the solids with the wine. As well known, wine makers commonly pull wine from different levels in the holding tank and circulate wine inside the tank by pumping wine back into the tank. The outlets, valves and other components of the holding tank are structured and arranged to allow the wine maker to accomplish the above without disturbing the sediment at the bottom of the tank and, as may be desired, to create a vortex motion inside the interior area of the tank to periodically circulate the wine therein.

To assist with the process of placing liquid, such as grape juice, into a storage holding tank, processing the liquid and then removing the finished product, such as wine, such holding tanks often utilize an outlet system known as a racking arm. A typical racking arm for storage holding tanks comprises an elongated tubular shaped pipe (which is commonly referred to as a barrel arm) that extends inside the interior area of the holding tank, a flange that mounts to a wall of the holding tank, an exterior pipe through which fluid is placed in and removed from the holding tank, a rotatable valve mechanism associated with the exterior pipe that allows the user to rotate the barrel arm inside the interior area of the holding tank to draw liquid therefrom at different levels in the tank and an operating valve that selectively allows fluid to be placed into or pulled from the tank. The barrel arm has a bend in it such that the distal opening into the barrel arm, which opening may be the inlet or outlet depending on whether liquid is being drawn from or being placed into the tank, is spaced apart from a central axis of the barrel arm where the barrel arm passes through the wall of the holding tank. Typically, the rotatable valve mechanism is rotated to rotate the barrel arm inside the tank and to adjust the position of the barrel arm opening to allow the user to remove liquid from or place liquid into the liquid holding tank at different elevation levels therein. The configuration and use of prior art racking arms and liquid holding tanks utilized therewith are well known to persons who are skilled in the relevant art.

In use, the rotatable valve mechanism of the racking arm is operated to position the barrel arm opening where the user desires to draw liquid from or place liquid into the liquid holding tank. In one use, the racking arm is operated to draw liquid from at or near the surface of the liquid in the tank. In another use, the operator will draw liquid from below the surface, such as toward the bottom of the tank, but above the solids that may have accumulated at the bottom of the tank to avoid drawing out solids with the desired product (i.e., wine). In yet another use, the operator of the racking arm will draw liquid from at or near the surface level of the liquid, but rotate the barrel arm as necessary to accommodate the lowering surface level of the liquid in the tank. These and other uses of a racking arm are generally well known to persons skilled in the art.

Although racking arms are generally beneficial for processing many different types of liquids, they have several well known problems. One important problem is that for some racking arms, it can be quite difficult for the operator to know which direction the barrel arm is pointing and, therefore, where the barrel arm opening is located relative to the liquid level in the tank. As will be readily appreciated by persons who are skilled in the art, the position of the barrel arm opening affects the location where the person will remove liquid from or place liquid into the holding tank, which directly impacts the operator's ability to avoid disturbing the sediment collected at the bottom of the tank. Another problem with many types of racking arms is that they are susceptible to leakage. Yet another problem is that some racking arms place excessive force on the wall of the holding tank that could cause that tank to leak or even rupture. One problem that is particularly unique to human consumable liquids is that many racking arms are not constructed to a 100% food grade standard. Yet another problem with many prior art racking arms is that removal of the operating valve (i.e., the flow control valve) from the valving system, which includes the rotatable valve mechanism, for repairs or replacement could also result in leakage of product from the holding tank.

What is needed is an improved racking arm that can be utilized with a liquid holding tank to allow the operator to be able to withdraw liquid from inside the tank at any level he or she desires. The new racking arm should be configured to allow the user to rotate the barrel arm to position the barrel arm opening at the desired level when he or she is withdrawing liquid from inside a liquid holding tank. Preferably, an improved racking arm will allow the operator of a liquid holding tank to rotate a barrel arm positioned inside the interior area of the tank to draw liquid from any liquid level without rotating the mounting flange, the control valve or the externally positioned flow pipe. An improved racking arm for a liquid holding tank should be structured and arranged so the operator of the tank can easily and efficiently draw liquid from the interior area of the tank and direct liquid into the tank in a manner that reduces the likelihood of the leakage of liquid from the racking arm. For use with human consumable liquids, such as wine and the like, an improved racking arm should be structured and arranged to be able to be made out of or sufficiently comprise materials that allow the racking arm to be 100% food grade. Preferably, the new racking arm should be configured for use with existing liquid holding tanks, easy to install and use and configured to be cost effective to utilize.

SUMMARY OF THE INVENTION

The new racking arm of the present invention provides the benefits and solves the problems identified above. That is to say, the present invention is directed to an improved racking arm which is beneficially configured to be utilized with a liquid storage tank to allow the operator of the tank to withdraw liquid from the tank and place liquid into the tank. More specifically, the racking arm of the present invention is structured and arranged to allow the operator of a liquid holding tank to controllably withdraw liquid from or place liquid into the interior area of the tank from or to any liquid level in the tank so as to avoid disturbing sediment collected on the bottom of the tank or to otherwise selectively control where the liquid is withdrawn from or placed into the tank. The new racking arm allows the user to rotate a barrel arm inside the holding tank to position the distal barrel arm opening at the desired level when withdrawing liquid from or placing liquid into the tank. More specifically, the racking arm of the present invention is structured and arranged to allow the operator of a liquid holding tank to rotate a barrel arm that is positioned inside the interior area of the tank to easily and efficiently draw liquid from any liquid level without rotating the mounting flange, the control valve or the externally positioned flow pipe in a manner that substantially reduces the likelihood of leakage. The new racking arm is structured and arranged such that it can be made to be 100% food grade so it can be utilized with human consumable liquids, such as wine and the like. In the preferred embodiment, the new racking arm is configured for use with existing liquid holding tanks, relatively easy to install and use and configured to be cost effective to utilize.

In one embodiment of the present invention, the new racking arm generally comprises an elongated, tubular barrel arm having a distal end that extends through a wall of a holding tank into the interior area thereof and a control valve which connects to the proximal end of the barrel arm to allow the user to adjust the position of a barrel arm opening at or near the distal end of the barrel arm. The control valve has a tubular valve body, a tubular barrel that is rotatably disposed in the valve body and a handle that is attached to the barrel. The valve body has a first end, a second end and a slot through the valve body between the first and second ends thereof. The barrel body defines a first end and a second end of the barrel, with the proximal end of the barrel arm being attached to or integral with the first end of the barrel. The barrel body defines a flow channel between the first and second ends of the barrel that is in fluid flow communication with the barrel arm opening inside the holding tank. The valve body and the barrel body are cooperatively structured and arrange to sealably allow rotation of the barrel in the valve body. The handle is disposed through the slot in the valve body so as to rotate the barrel inside the valve body upon movement of the handle along the slot, wherein rotation of the barrel by the handle will rotate the distal end of the barrel arm to selectively position the barrel arm opening in the interior area of the holding tank.

In a preferred embodiment, the control valve has at least one bearing groove and an O-ring groove in an inner surface of the valve body, with the bearing groove retaining a bearing and the O-ring groove retaining an O-ring. In this configuration, the barrel is rotatably positioned inside the valve body with each of the bearing and the O-ring being disposed between the valve body and the barrel body to sealably allow rotation of the barrel relative to the valve body. Generally, the control valve will have a bearing groove and an O-ring groove at or near each of the first and second ends of the valve body, with each of the bearing grooves retaining a bearing and each of the O-ring grooves retaining an O-ring. As with the above, each of the bearings and O-rings are disposed between the valve body and the barrel body to sealably allow the barrel to rotate relative to the valve body.

The preferred embodiment of the new racking arm has a barrel positioning mechanism associated with the valve body and the barrel for rotatably positioning the barrel in the valve body and to selectively prevent the barrel from moving out of the valve body and the barrel arm falling inside the holding tank. In one configuration, the barrel positioning mechanism comprises a pin aperture that is disposed through the valve body, a locating groove on the barrel body of the barrel and a pin which is sized and configured to fit through the pin aperture and into the locating groove. The locating groove and the pin aperture are cooperatively positioned to place the locating groove in alignment with the pin aperture such that when the pin is disposed through the pin aperture the pin will engage the locating groove. The barrel positioning mechanism can also include a pin retainer that is mounted to an outer surface of the valve body at the pin aperture. The pin retainer has a retainer aperture aligned with the pin aperture such that the pin is received through each of the retainer aperture and the pin aperture and into the locating groove of the barrel to properly position and hold the barrel in the valve body.

In a preferred configuration, the new racking harm has a dust cover that is slidably received in a groove disposed on an outer surface of the valve body, with the slot positioned in the groove so as to be covered by the dust cover. The dust cover has an aperture through which the handle is positioned so as to allow the handle to attach to the barrel and to move between a first end and second end of the slot so as to rotate the barrel inside the valve body. In another configuration, the second end of the barrel body has a tapered section that is disposed in fluid flow communication with the flow channel, with the tapered section being sized and configured to receive an exterior flow pipe and, typically, an operating valve.

In a preferred embodiment, the new racking arm also has a barrel engaging mechanism that is associated with each of the valve body, the barrel and the handle for engaging the barrel in the valve body to prevent or allow rotation of the barrel in the valve body so as to allow or prevent movement of the distal end of the barrel arm in the interior area of the holding tank. In this embodiment, the barrel engaging mechanism is structured and arranged to selectively place the handle in a loosened condition or a tightened condition. In the loosened condition, the barrel engaging mechanism allows movement of the handle in the slot and rotation of the barrel in the valve body to move the barrel arm opening in the interior area of the holding tank. In the tightened condition, the barrel engaging mechanism prevents movement of the handle in the slot and rotation of the barrel in the valve body so as to fix the position of the barrel arm opening in the interior area of the holding tank. In one configuration, the barrel engaging mechanism comprises a cinch plate having an aperture therethrough, a mounting connector attached to or integral with the handle and a handle aperture in the barrel body that is positioned in alignment with the slot of the valve body. In this configuration, the mounting connector has an enlarged portion and an engaging portion. The enlarged portion of the mounting connector is configured to engage an upper surface of the cinch plate to press a curved lower surface of the cinch plate against the outer surface of the valve body at the slot thereof to place the handle in its tightened condition. The engaging portion of the mounting connector is configured to be received through the aperture of the cinch plate and through the slot of the valve body to extend to and engage the handle aperture of the barrel to allow rotation of the barrel when the handle is in the loosened condition and to prevent rotation of the barrel when the handle is in the tightened condition.

Typically, the valve body of the control valve is attached to or integral with a mounting flange, with the mounting flange being integral with or attached to the wall of the holding tank. In the preferred configurations, the valve body of the control valve is structured and arranged to be removably attached to the mounting flange so as to removably secure the racking arm to the holding tank with the distal end of the barrel arm disposed in the interior area of the holding tank.

Accordingly, the primary object of the present invention is to provide a new racking arm that has the advantages set forth above and which overcomes the disadvantages and limitations associated with presently available racking arms that are utilized to allow a person to controllably place liquid into or draw liquids from a liquid storage tank.

It is an important object of the present invention to provide a new racking arm that is specifically structured and arranged to be utilized with a liquid holding tank to allow the user of the racking arm to easily, quickly and accurately control the position from which he or she places liquid into or draws liquid from the interior of the liquid holding tank.

It is also an important object of the present invention to provide a new racking arm that allows a user to rotate a tubular barrel arm inside the interior of a liquid holding tank in a manner which positions the opening at the distal end of the barrel arm at a level inside the tank at which the user desires to place liquid into the tank or to withdraw liquid from the tank, particularly so as to allow the user to do so without withdrawing, mixing or otherwise disturbing solids at the bottom of the tank which have settled from the liquid.

An important aspect of the present invention is that it provides a new racking arm that accomplishes the objectives set forth above and elsewhere in the present disclosure.

Another important aspect of the present invention is that it provides an improved racking arm for use with liquid holding tanks which is structured and arranged to allow the user to easily, quickly and more accurately rotate a barrel arm that extends into the tank so as to position an opening at the distal end of the barrel arm at a level in the tank from which he or she desires to place liquid into or draw liquid from the interior of the liquid holding tank.

Another important aspect of the present invention is that it provides an improved racking arm for use with liquid holding tanks which is structured and arranged to allow the operator of a liquid holding tank to more efficiently, accurately and effectively withdraw liquid from or place liquid into the interior area of the tank in a manner that avoids mixing, withdrawing or otherwise disturbing any sediment or other solids which have collected on the bottom of the tank.

Another important aspect of the present invention is that it provides an improved racking arm which is structured and arranged to beneficially allow the operator of a liquid holding tank to rotate a barrel arm that is positioned inside the interior area of the tank to accurately draw liquid from any level inside the tank without rotating the mounting flange, the control valve or the externally positioned flow pipe and in a manner that substantially reduces the likelihood of leakage from the racking arm and/or damage to the tank.

Another important aspect of the present invention is that it provides an improved racking arm which can be made to be 100% food grade so the new racking arm can be utilized with human consumable liquids.

In yet another important aspect of the present invention, the improved racking arm is configured for use with existing liquid holding tanks, is relatively easy to install and use and is configured to be cost effective to utilize.

As will be explained in greater detail by reference to the attached figures and the description of the preferred embodiment which follows, the above and other objects and aspects are accomplished or provided by the present invention. As set forth herein and will be readily appreciated by those skilled in the art, the present invention resides in the novel features of form, construction, mode of operation and combination of processes presently described and understood by the claims. The description of the invention which follows is presented for purposes of illustrating one or more of the preferred embodiments of the present invention and is not intended to be exhaustive or limiting of the invention. The scope of the invention is only limited by the claims which follow after the discussion.

BRIEF DESCRIPTION OF THE DRAWINGS

In the drawings which illustrate the preferred embodiments and the best modes presently contemplated for carrying out the present invention:

FIG. 7 is a side perspective view of the control valve and handle of FIG. 3.

FIG. 8 is a partially exploded side perspective view of the racking arm of FIG. 3, shown without the barrel arm, showing the handle, cinch plate, mounting connector and dust cover separate from the control valve.

DETAILED DESCRIPTION OF THE PREFERRED EMBODIMENTS

With reference to the figures where like elements have been given like numerical designations to facilitate the reader's understanding of the present invention, the preferred embodiments of the present invention are set forth below. The enclosed figures are illustrative of several potential preferred embodiments and, therefore, are included to represent several different ways of configuring the present invention. Although specific components, materials, configurations and uses are illustrated, it should be understood that a number of variations to the components and to the configuration of those components described herein and shown in the accompanying figures can be made without changing the scope and function of the invention set forth herein. For instance, although the description and figures included herewith generally describe and show particular materials, shapes and configurations for the various components of the new racking arm of the present invention, those skilled in the art will readily appreciate that the present invention is not so limited. In addition, the exemplary embodiment of the new racking arm is shown and described herein with only those components that are required to disclose the present invention. As such, many of the necessary mechanical elements for combining components together, if any, and for using the present invention are not shown or necessarily described below, but which are well known to persons who are skilled in the relevant art. As will be readily appreciated by such persons, the various elements of the present invention that are described below may take on any form consistent with forms that are readily realized by a person of ordinary skill in the art having knowledge of racking arms and liquid holding tanks and the various valves and flanges utilized with such racking arms and tanks.

Figure 1:
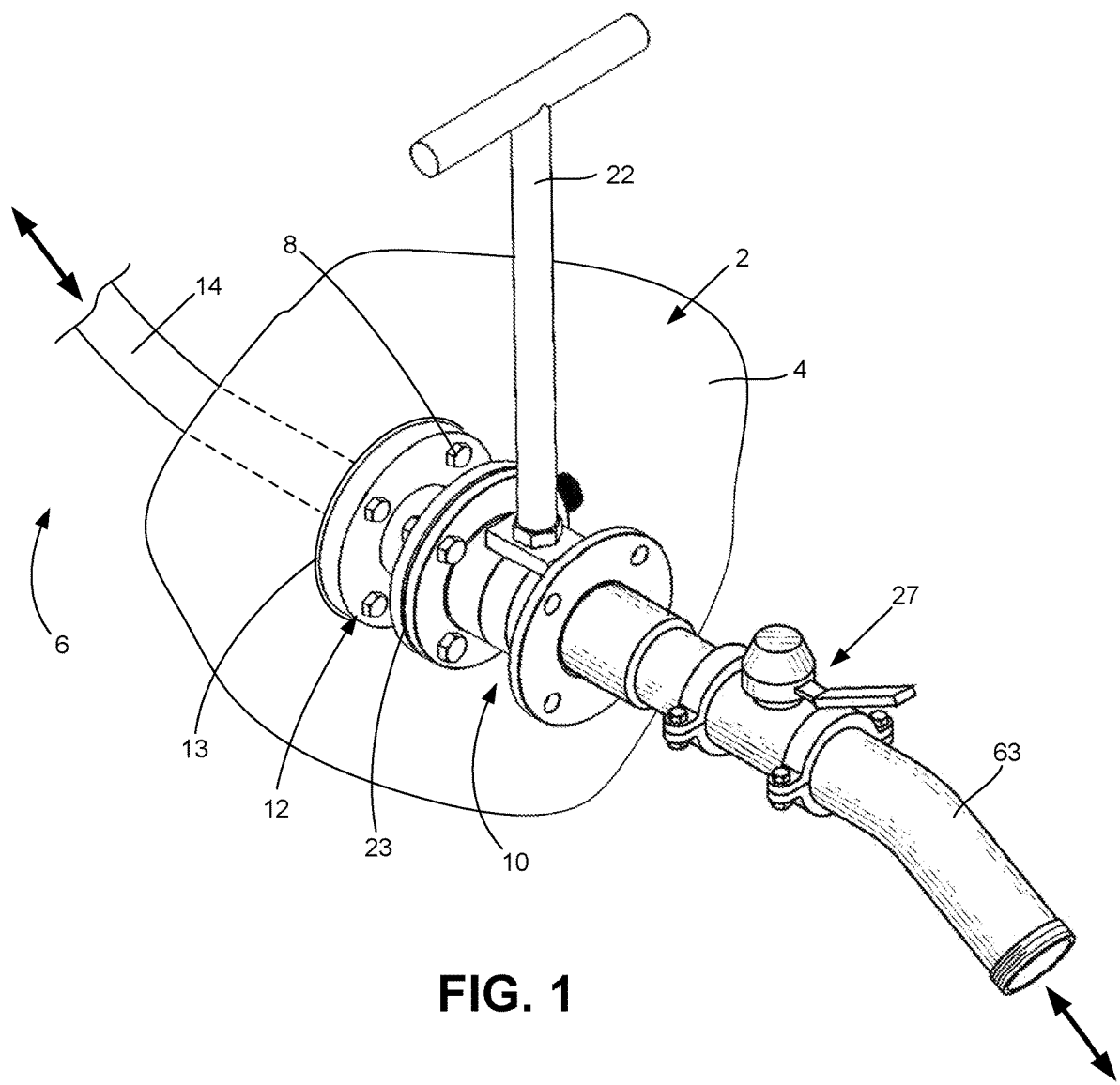
FIG. 1 is a side perspective view of a racking arm that is configured according to the present invention shown in use with a liquid holding tank with a majority of the wall of the tank cut-away to show the barrel arm positioned inside the interior area of the tank.
Figure 2:
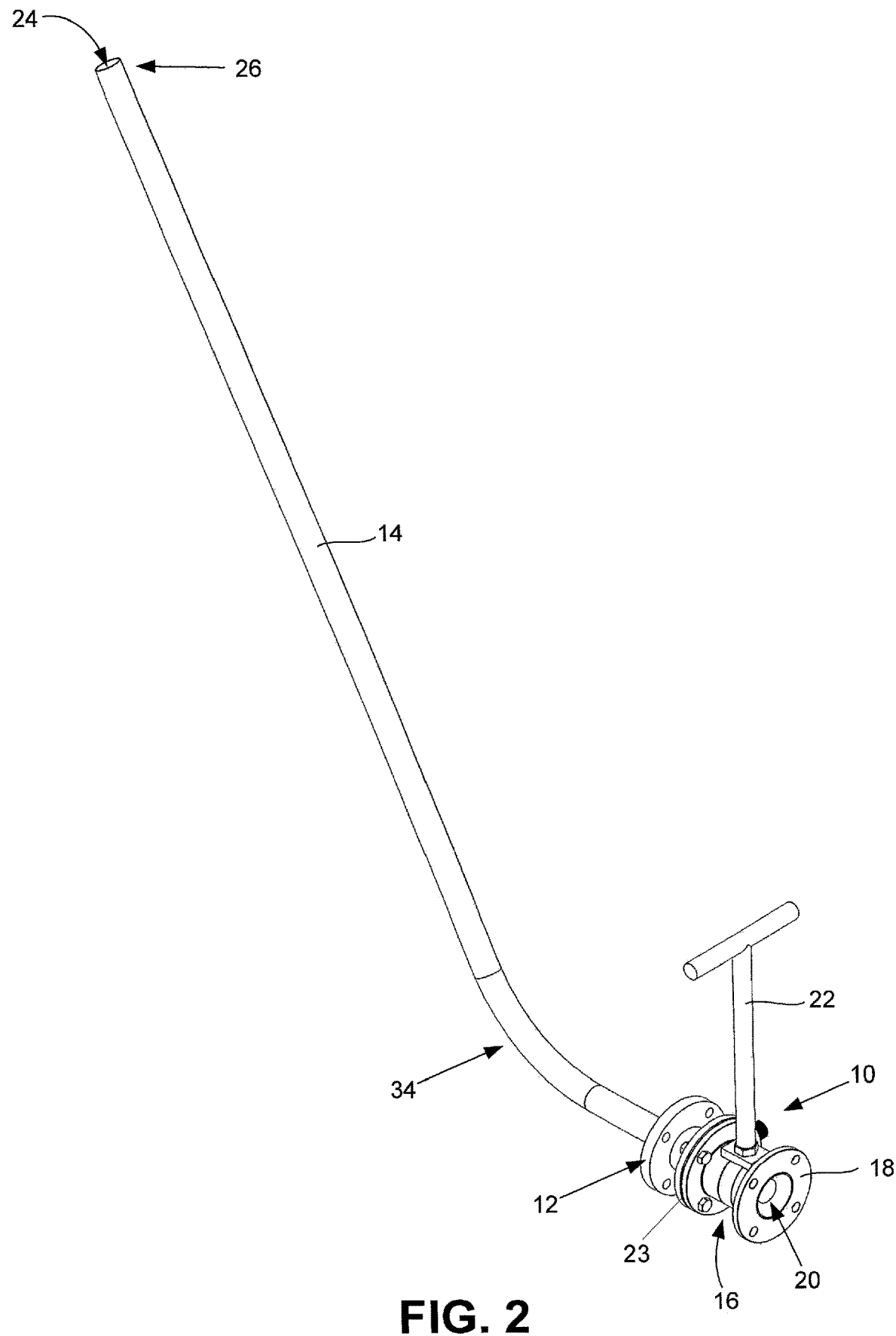
FIG. 2 is a front perspective view of the racking arm of FIG. 1 shown without the tank and flange seal and showing the full length of the barrel arm.
Figure 3:
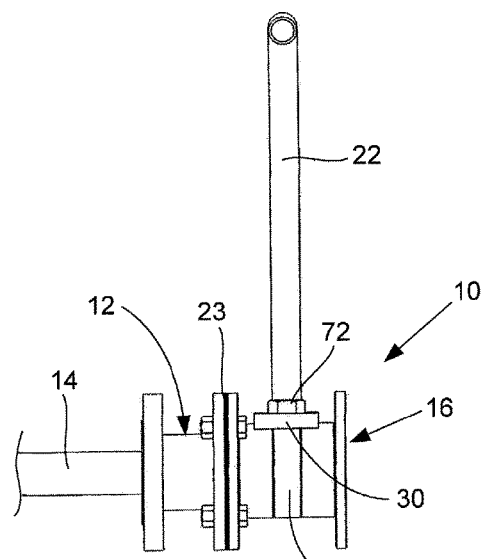
FIG. 3 is a left side view of the racking arm of FIG. 2 showing a portion of the barrel arm thereof.
Figure 4:
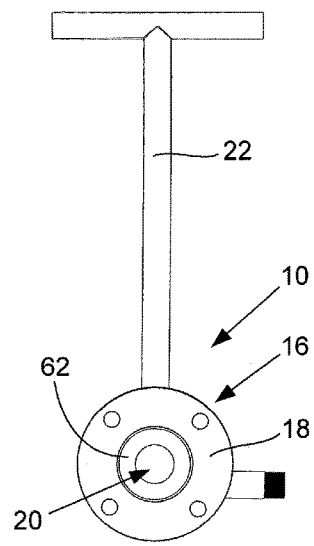
FIG. 4 is a front view of the racking arm of FIG. 3.

A racking arm that is configured pursuant to one of the preferred embodiments of the present invention is shown generally as 10 in FIGS. 1-5. The racking arm 10 of the present invention is structured and arranged to be utilized with a liquid holding tank 2 having one or more walls 4 that define an interior area 6 of the holding tank 2, as shown in FIG. 1. In the embodiment of the present invention shown in FIG. 1, the racking arm 10 is removably mounted to one of the walls 4 of the holding tank 2 utilizing one or more, typically a plurality of, bolts, screws or other tank connectors 8. In the embodiment shown in the figures, the new racking arm 10 is mounted to a mounting flange 12 that is mounted onto one of the walls 4 of the holding tank 2 with an appropriately configured gasket or like mounting seal 13 disposed between the mounting flange 12 and the wall 4 of the holding tank 2, as shown in FIG. 1. As best shown in FIGS. 1-5 and 8, the new racking arm 10 of the present invention generally comprises an elongated tubular-shaped barrel arm 14, a control valve 16 having a valve body 18, a tubular-shaped barrel 20 that is rotatably disposed inside the valve body 18 and a handle 22 that is removably connected to the barrel 20 to rotate the barrel 20 relative to the valve body 18. The barrel arm 14 is sized and configured such that part of the barrel arm 14 extends into the interior area 6 of holding tank 2 and part of the barrel arm 14 extends outside the tank 2 through the mounting flange 12 to the control valve 16 where it connects to the barrel 20. The tubular valve body 18 of the control valve 16 is removably mounted to the mounting flange 12, with a flange seal 23 disposed between the control valve 16 and the mounting flange 12, as best shown in FIGS. 1-3, 5-6 and 7-8. The barrel arm 14 connects to the barrel 20 that is rotatably disposed inside the valve body 18 of the control valve 16. The handle 22, which is shown as a T-handle, is removably connected to the barrel 20 to rotate the barrel 20 relative to the valve body 18 of the control valve 16. As set forth in more detail below, the barrel arm 14 is rotatably positioned in the interior area 6 of holding tank 2, rotatably received through the mounting flange 12 and attached to or integral with the barrel 20 such that when the user pivots the handle 22, the barrel 20 will rotate the barrel arm 14 inside the interior area 6 of the holding tank 2. In use, the user of the new racking arm 10 utilizes the handle 22 to pivot the barrel arm 14 inside the holding tank 2 to selectively position a barrel arm opening 24 located at the distal end 26 of barrel arm 14, as shown in FIG. 1, to control the location in the interior area 6 where liquid is placed into or drawn from the holding tank 2.

As set forth in the Background, for many types of uses of holding tank 2, it is very important to be able to carefully position the barrel arm opening 24 at the distal end 26 of the barrel arm 14 when placing liquid into a holding tank 2 and/or withdrawing liquid from the holding tank 2 so as to not mix, withdraw or otherwise disturb any sediment or other solids that are located at the bottom of the holding tank 2 or to create a vortex that will purposefully mix the contents of holding tank 2. As well known to persons who are skilled in the art, in order to selectively position the barrel arm opening 24 inside holding tank 2, the user must know, at least generally, where the barrel arm opening 24 is located and how the location of the barrel arm opening 24 is modified when he or she rotates the barrel arm 14. In addition, as also set forth in the Background, it is important that rotation of the racking arm 10 will not cause leaks and/or damage the wall 4 of the holding tank 2. The racking arm 10 also needs to be structured and arranged to allow the user to repair or remove/replace any operating valves 27 that are located adjacent to the control valve 16, as shown in FIG. 1. As set forth in more detail below, the new racking arm 10 of the present invention is structured and arranged to allow the user to better control the positioning of the barrel arm opening 24 inside the interior area 6 of the holding tank 2 such that the user can avoid disturbing any solids in the tank 2 when he or she is placing fluid in the holding tank 2 or withdrawing fluid from the holding tank 2. The new racking arm 10 also will reduce the likelihood of leaks and damage to the walls 4 of the holding tank 2 and allow the user to replace or repair the operating valves 27.

Persons who are skilled in the relevant art will readily appreciate that the components described above are subject to various modifications and alternative configurations. For instance, instead of being removably mounted to the respective components, the mounting flange 12 can be integral with or fixedly attached (i.e., by welding or the like) to a wall 4 of the holding tank 2 and/or be integral with or fixedly attached to the control valve 16 and/or the control valve 16 can be integral with or fixedly attached to the operating valve 27. The holding tank 2, mounting flange 12, control valve 16 and operating valve 27 can be configured in a wide variety of different manners and made from a variety of different materials and still be able to accomplish the objects of the present invention. Although the operating valve 27 shown in FIG. 1 is a ball valve having a handle, persons who are skilled in the art will readily appreciate that a wide variety of different types of flow control valves, including butterfly valves, gate valves and the like (having a user interface mechanism other than a handle) can be utilized as the operating valve 27 associated with the control valve 16 of the racking arm 10.

Figure 13:
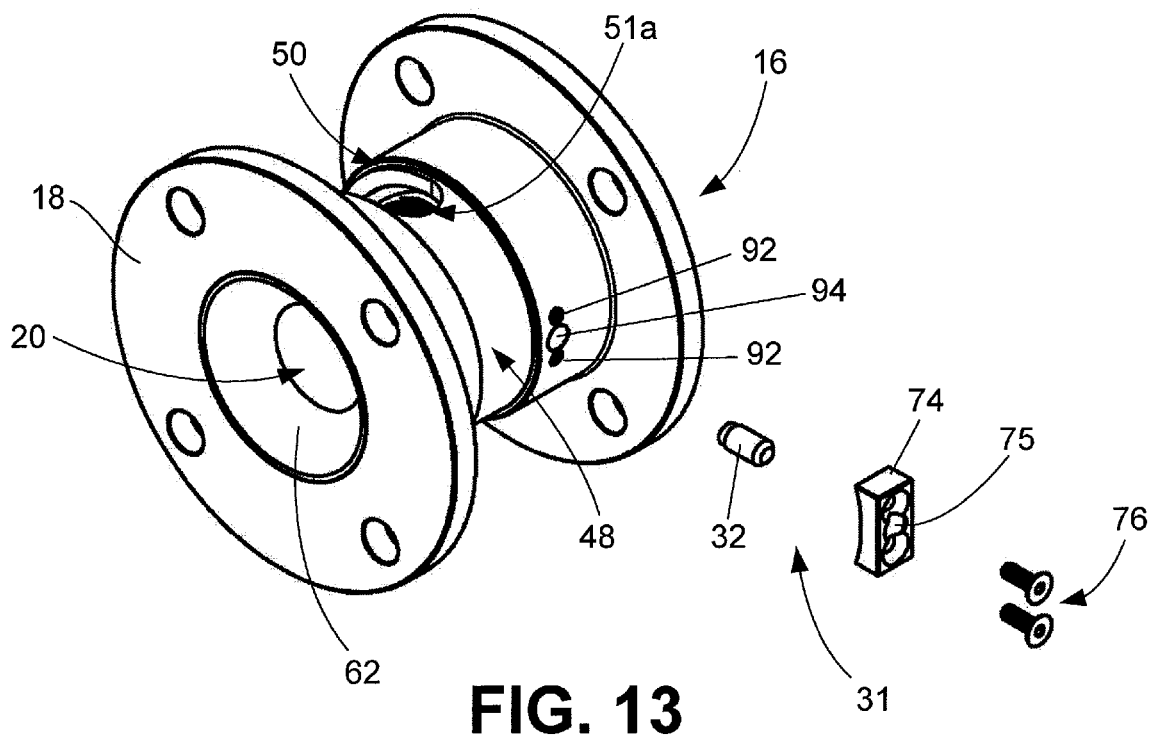
FIG. 13 is a partially exploded front perspective view of the control valve of FIG. 10 showing the pin, pin retainer and securing elements separate from the valve body.
Figure 14:
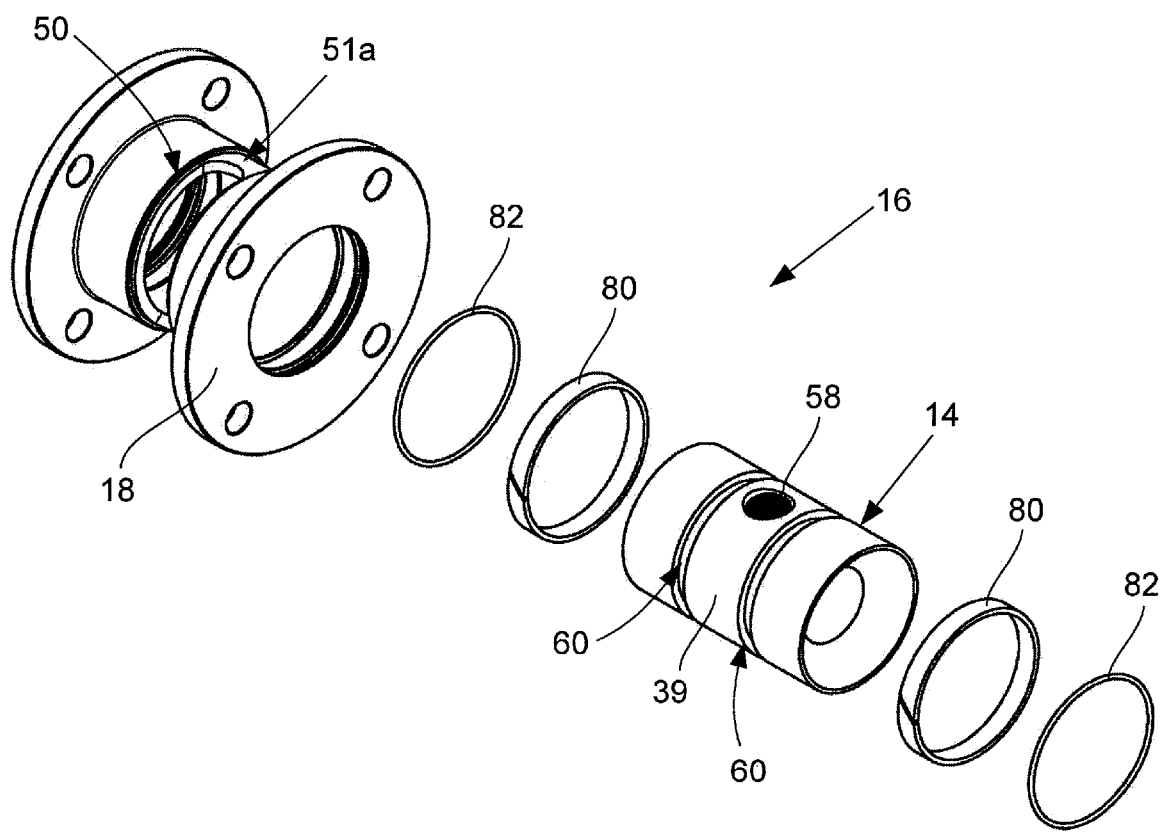
FIG. 14 is an exploded side perspective view of the control valve of FIG. 13 showing the bearings, o-rings and barrel separate from the valve body.
Figure 23:
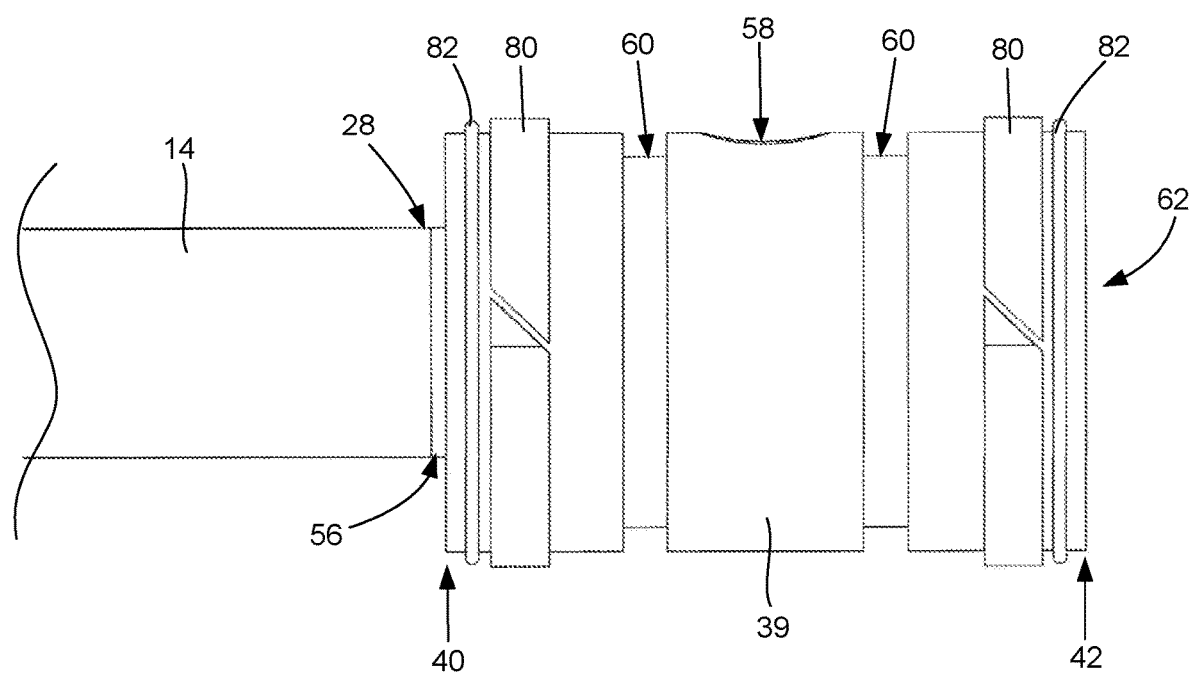
FIG. 23 is a side view of the barrel attached to the proximal end of the barrel arm.

The proximal end 28 of the barrel arm 14 connects to the barrel 20, as shown in FIG. 23. In a typical configuration, the proximal end 28 of the barrel arm 14 is fixedly attached to the barrel 20. Alternatively, the barrel 20 may be integrally formed with or removably attached (i.e., threadably connected) to the proximal end 28 of the barrel arm 14. As set forth in more detail below, the racking arm 10 has a barrel engaging mechanism 29 with a clinch plate 30 positioned on the outside of the valve body 18 where the t-handle 22 connects to the barrel 20, as best shown in FIGS. 3-5, 7 and 17-18, to hold the barrel 20 and, therefore, barrel arm 14 in a particular position, and a barrel positioning mechanism 31 with a pin 32 (which is typically made out of brass or the like) to securely position the barrel 20 inside the valve body 18 and ensure the racking arm 10 will stay together when the t-handle 22 is removed from the control valve 16, as best shown in FIGS. 9-11 and 13. The new racking arm 10 has a pair of bearings 80 and a pair of O-rings 82 in the inner surface 45 of the valve body 16, as best shown in FIGS. 14 and 23, that allows the barrel 20 to rotate relative to the valve body 18 and, therefore, the barrel arm 14 to rotate in the holding tank 2 in a manner that prevents leakage of liquid from the racking arm 10. As set forth in more detail below, each of the above-described components are structured and arranged to be utilized together to form the new racking arm 10 of the present invention that allows, among other activities, the operator to draw liquid from or pump liquid into the interior area 6 of the tank 2 at the desired level therein.

As set forth above, the flange 12 attaches to a wall of the holding tank 2, as shown in FIG. 1, that stores liquid which is accessed through the racking arm 10 of the present invention. The flange 12 is positioned at an opening (not shown) in a wall 4 of the holding tank 2 to provide an exit point for the proximal end 28 of the barrel arm 14, the majority of which is positioned inside the interior area 6 of the holding tank 2. The configuration and use of the flange 12 are well known to persons skilled in the art with regard to holding tanks 2 and prior art racking arms that are utilized with such holding tanks 2. As also set forth above, the proximal end 28 of the barrel arm 14 passes through the opening in the tank wall 4, through the flange 12 and to the control valve 16, where it connects to the barrel 20, as shown in FIG. 23, rotatably positioned inside the valve body 18, as shown in FIGS. 4 and 6-13, such that the barrel arm 14 will rotate with the rotation of the barrel 20 inside the control valve 16. In one embodiment, the proximal end 28 of the barrel arm 14 is welded to the barrel 20.

As well known in the art, the tubular-shaped barrel arm 14 has a bent area 34, as shown in FIG. 1. As well known to persons skilled in the art, the bent area 34 of the barrel arm 14 allows the operator of the holding tank 2 to selectively position the barrel arm opening 24, typically at the distal end 26 of barrel arm 14, at the level of the liquid in the interior area 6 of the holding tank 2 where he or she desires when drawing liquid from the holding tank 2 or pumping liquid into the holding tank 2. In one use, the bent area 34 allows the operator to withdraw wine from at or near the top of the liquid level in the holding tank 2 to avoid withdrawing the settled grape debris at the bottom of the holding tank 2. As set forth in more detail below, rotation of the barrel 20 relative to the valve body 18 of control valve 16, by using the handle 22, will rotate the barrel arm 14 to position the barrel arm opening 24, located at the distal end 26 of the barrel arm 14, where the user desires to withdraw liquid from or pump liquid into the interior area 6 of the holding tank 2 with which the racking arm 10 is utilized.

After passing through the opening in the wall 4 of the holding tank 2 and the flange 12, the proximal end 28 of the barrel arm 14 connects to the control valve 16. More specifically, the proximal end 28 of the barrel arm 14 connects to the barrel 20, as shown in FIG. 23, inside the valve body 18 of the control valve 16. As best shown in FIGS. 11-12, 14-16, and 19-23, the valve body 18 of the control valve 16 has a first end 36 and a second end 38 and the barrel 20 has a barrel body 39 with a corresponding first end 40 and second end 42, such that the first end 40 of the barrel 20 is at or near the first end 36 of the valve body 18 and the second end 42 of the barrel 20 is at or near the second end 38 of the valve body 18 when the barrel 20 is disposed inside the valve body 18, as shown in FIGS. 8-13. The barrel body 39 defines a flow channel 43, best shown in FIGS. 19 and 22, that is in fluid flow communication with the barrel arm 14 and, therefore, the barrel arm opening 24 at or near the distal end 26 of the barrel arm 14.

Figure 9:
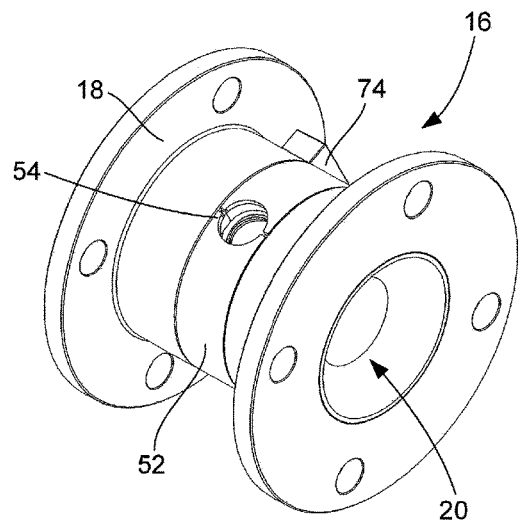
FIG. 9 is a right side perspective view of the control valve of FIG. 7 shown without the handle, cinch plate and mounting connector.
Figure 10:
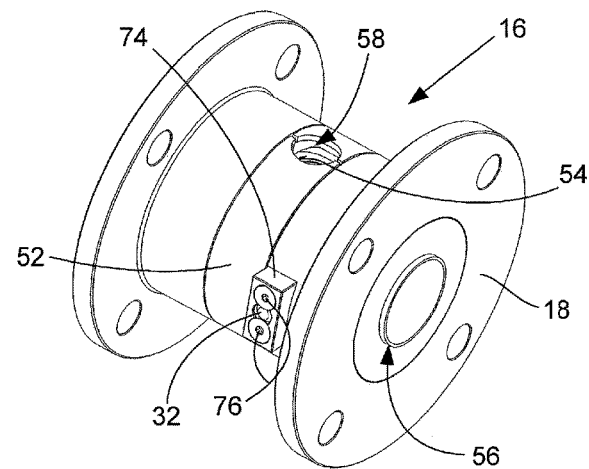
FIG. 10 is a left side perspective view of the control valve of FIG. 9 to better illustrate the pin and pin retainer.
Figure 11:
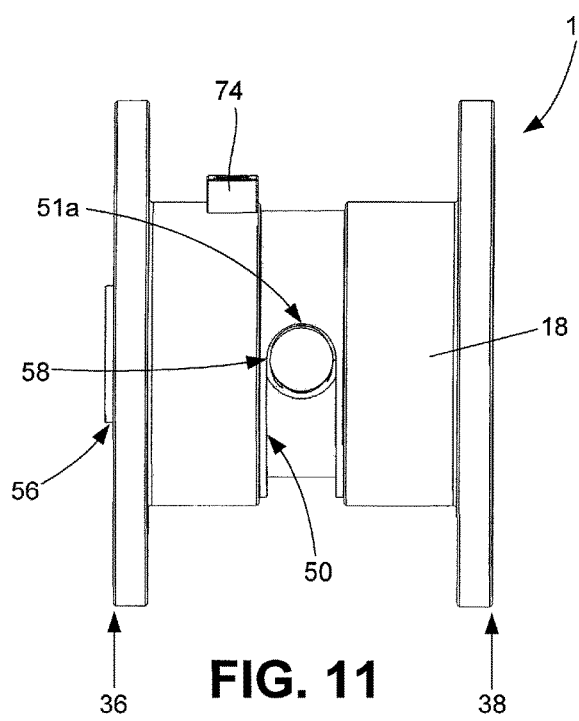
FIG. 11 is a top view of the control valve of FIG. 9 shown without the dust cover to illustrate the groove and slot.
Figure 12:
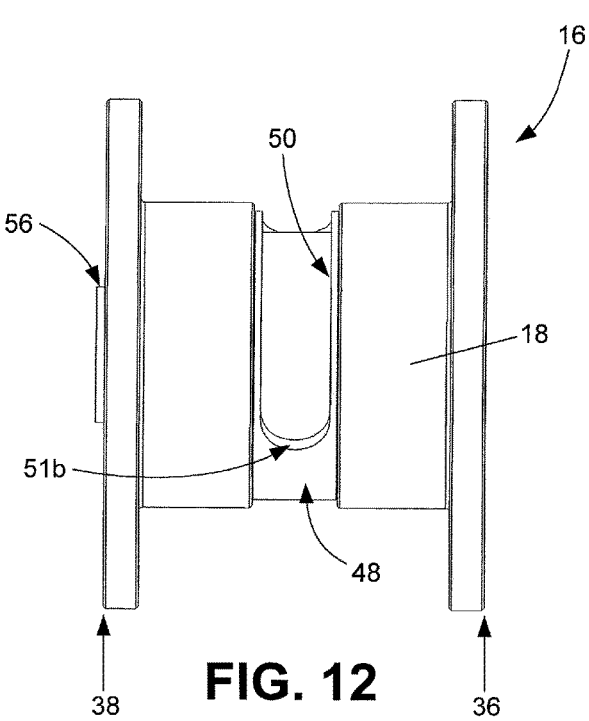
FIG. 12 is a bottom view of the control valve of FIG. 11.
Figure 15:
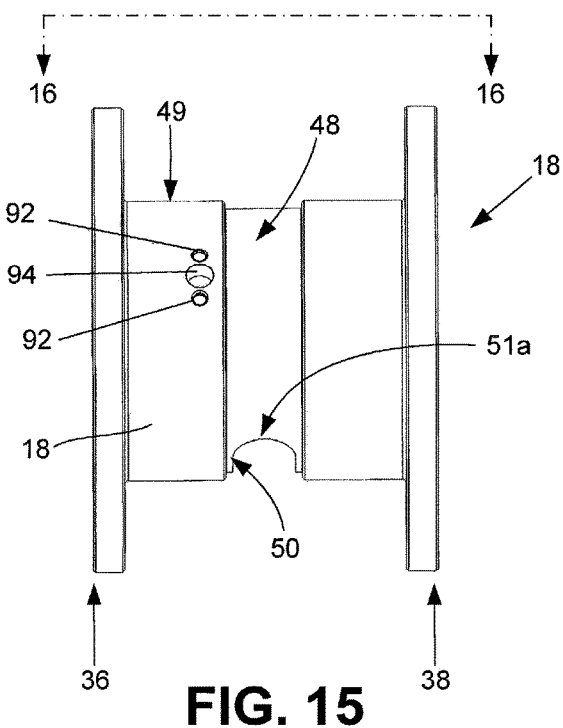
FIG. 15 is a side view of the valve body of the control valve of FIG. 5.
Figure 16:
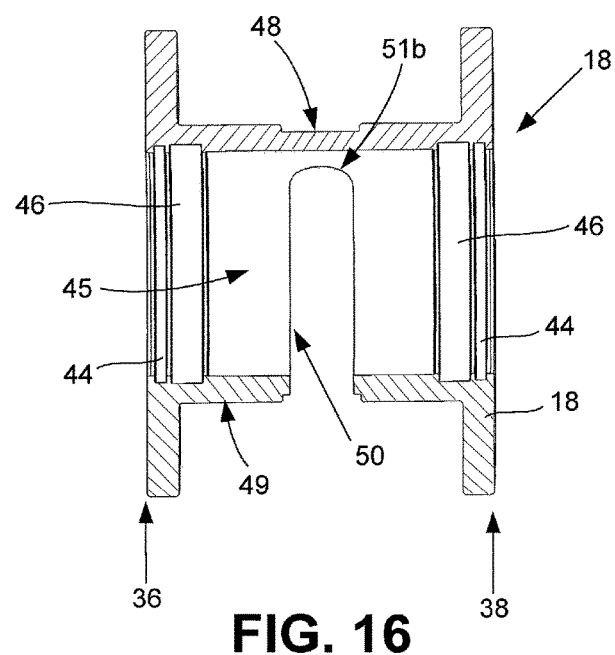
FIG. 16 is a cross-sectional side view of the valve body of the control valve of FIG. 15 taken through lines 16-16 of FIG. 15.

The valve body 18 is the primary fixed component on racking arm 10. The other components of the racking arm 10 bolt onto, move inside of or are attached to the valve body 18. More specifically, the valve body 18 is structured and arranged to allow the barrel 20 to rotate inside of and relative to the valve body 18, retain the bearings 80 and O-rings 82 that are utilized to sealably allow such rotation (i.e., rotate without loss of liquid from the racking arm 10), and allow a user to pivot the handle 22 so he or she can rotate the barrel 20 and, therefore, the barrel arm 14 to move the barrel arm opening 24 to the desired position. To accomplish the above, the valve body 18 has internal grooves for the bearings 80 and O-rings 82. More specifically, the valve body 18 has an O-ring groove 44 (that retains an O-ring 82) and a bearing groove 46 (that retains a bearing 80) on the inner surface 45 of the valve body 16 at or near each end 36/38 of valve body 18, as best shown in FIG. 16. In one embodiment, each of the O-rings 82 are sized and configured to securely fit in the O-ring grooves 44 and are made out of a food grade material, such as silicone or the like, for use with wine and other human-consumable liquids. The bearings 80 are sized and configured to securely fit in the bearing grooves 46 and prevent metal to metal contact between the valve body 18 and the barrel 12 and, in one of the preferred configurations, are made out of food grade material, such as food grade PTFE virgin Teflon or the like, to allow use of the racking arm 10 with human-consumable liquids. The valve body 18 also has an externally positioned, generally centrally located groove 48, as best shown in FIGS. 8, 11-13 and 15-16. Cut into the center groove 48 is a slot 50, as best shown in FIGS. 11-12 and 14-16. The slot 50 has opposing ends, shown as ends 51a and 51b in FIGS. 8, 11-12 and 14-16, that serve as stops for the rotation of the barrel 20 and, therefore, the rotation of the barrel arm 14 inside the interior area 6 of the holding tank 2, as described in more detail below. The curved length of the slot 50, between ends 51a/51b, defines the amount of rotation that is allowed for the barrel arm 14. In one embodiment, the slot 50 is approximately 135 degrees around the center groove 48. During use, a dust cover 52, best shown in FIGS. 8-10, is sized and configured to fit within the center groove 48 over slot 50. The dust cover 52 is allowed to rotate with the movement of the handle 22 to keep dirt, mud and other debris from the barrel 20 inside the valve body 18. An aperture hole 54 (best shown in FIGS. 8-10) in the nylon band 52 allows the lower end of the handle 22 (i.e., the T-handle) to pass through the valve body 18 to connect to the barrel 20, as explained below, so the handle 22 can be utilized to rotate the barrel 20.

As previously described, the barrel 20 is rotatably positioned inside the valve body 18 and the first end 40 thereof is connected to the proximal end 28 of the barrel arm 14 such that rotation of the barrel 20 will rotate the barrel arm 14 in the interior area 6 of the holding tank 1 to position the barrel arm opening 24 where the operator of the racking arm 10 desires. As also set forth above, in a preferred embodiment, the first end 40 of the barrel 20 is welded to the proximal end 28 of the barrel arm 14. To assist with connecting to the barrel arm 14, the first end 40 of the barrel 20 has a recessed area 56, best shown in FIGS. 11-12 and 20-23, that is sized and configured to be received in the proximal end 28 of barrel arm 14. The barrel 20 has a threaded (in a preferred embodiment) handle aperture 58, as best shown in FIGS. 9-10 and 19-23, that is sized and configured to threadably receive the cooperatively sized and configured lower end of the handle 22 so that movement of the handle 22 will rotate the barrel 20, which in turn rotates the barrel arm 14 to position the distal end 26 thereof, having barrel arm opening 24, where the operator desires to direct liquid into or remove liquid from the holding tank 2. As described in more detail below, the operator turns the handle 22 in one direction to allow the barrel 20 to rotate inside the valve body 18 (and the barrel arm 14 inside the tank) and turns the handle 22 the other direction to lock the position of the barrel 20 relative to the valve body 18 and, therefore, lock the position of the barrel arm 14 in the holding tank 2. For the barrel engaging mechanism 29, the barrel 20 has a pair of locating grooves 60 on the outer surface 49 of the valve body 16, shown in FIGS. 14 and 19-23, that receive the brass pin 32 so as to position the handle aperture 58 relative to the slot 50 of the valve body 18. With the bearings 80 and O-rings 82, there is no metal-to-metal contact between the valve body 18 and the barrel 20. As best shown in FIGS. 6-9, 13-14, 19 and 22, the second end 42 of the barrel 20 of racking arm 10 has a tapered section 62 that is sized and configured to receive and engage an exterior flow pipe or outlet tube 63 having the operating valve 27 (shown in FIG. 1) such as a ball valve, butterfly valve, gate valve or the like, outward of control valve 16 (the configuration and use of operating valves 27 are well known to persons skilled in the relevant art). The exterior flow pipe 63, which is in fluid flow communication with the barrel 20, barrel arm 14 and, as such, the interior area 6 of the holding tank 2, and the operating valve 27 are utilized to draw liquid from the holding tank 2 or pump liquid into the holding tank 2 through the racking arm 10. In other embodiments, the operating valve 27 can be secured to, typically by using bolts or screws, the second end 38 of the valve body 18 of the control valve 16.

As set forth above, the handle 22, best shown in FIGS. 1-5 and 7-8, is provided to allow the operator to operatively control the control valve 16 to rotate the barrel arm 14 in order to position the barrel arm opening 24, which is at the distal end 26 of the barrel arm 14, in the holding tank 2 where he or she desires to withdraw or add liquid to the interior area 6 of the holding tank 2. The lower end of the handle 22 is sized and configured to fit through the cinch plate 30, aperture 54 in the dust cover 52, the slot 50 and to engage, typically threadably, the handle aperture 58 in barrel body 39 of the barrel 20, as shown with regard to FIGS. 1-3, 4, 7-11. In one embodiment, the lower end of the handle 22 is externally threaded to match the internally threaded handle aperture 58 of barrel 20.

Figure 17:
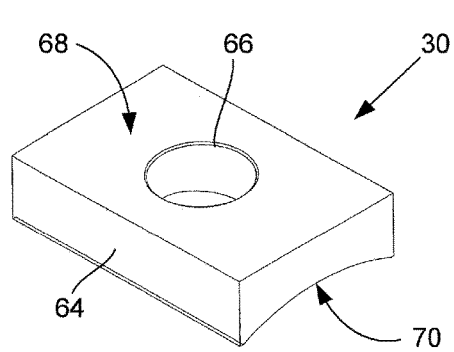
FIG. 17 is a top perspective view of the cinch plate of FIG. 8
Figure 18:
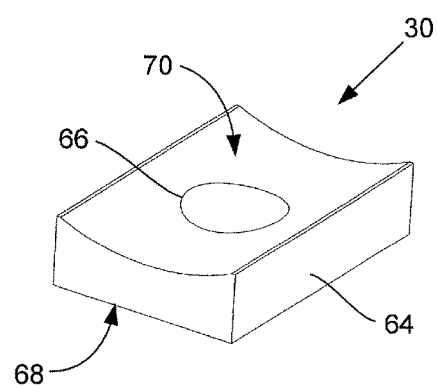
FIG. 18 is a bottom perspective view of the cinch plate of FIG. 17.
Figure 19:
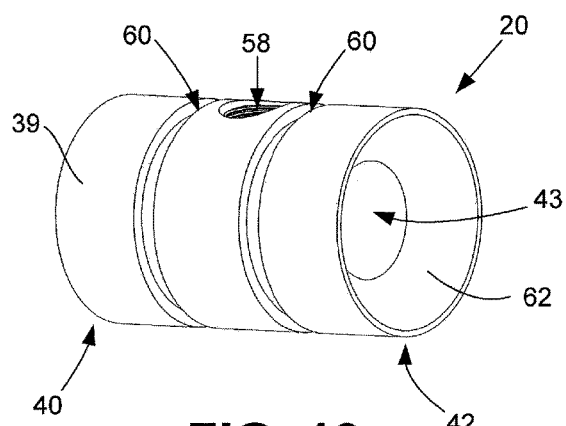
FIG. 19 is a side perspective view of the barrel of FIG. 14.
Figure 20:
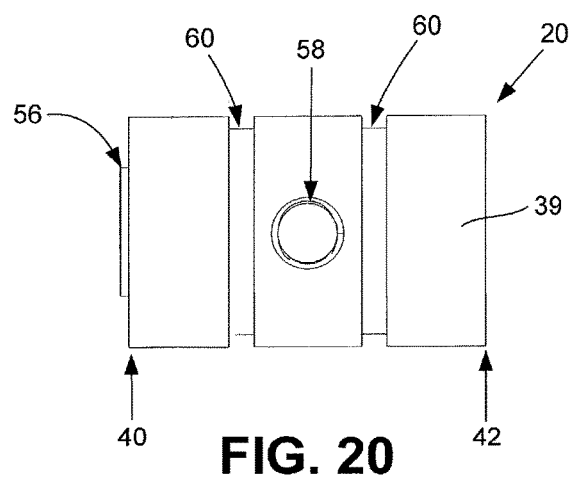
FIG. 20 is a top view of the barrel of FIG. 19.
Figure 21:
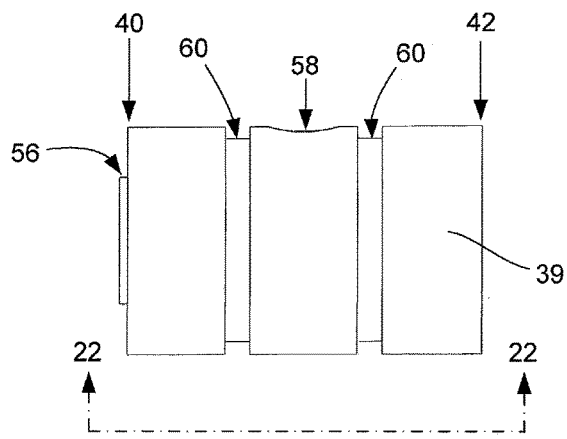
FIG. 21 is a side view of the barrel of FIG. 19.
Figure 22:
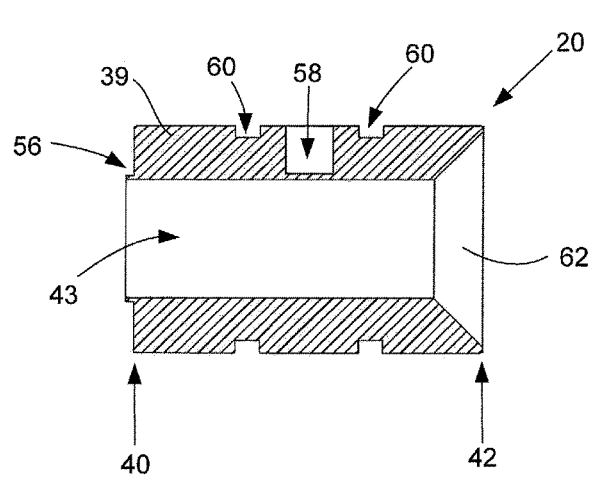
FIG. 22 is a cross-sectional side view of the barrel of FIG. 21 taken through lines 22-22 of FIG. 21.

The user utilizes the handle 22, which is attached to (preferably removably) or integral with the control valve 16 (as shown in FIGS. 1-3, 5 and 7-8), to pivot the barrel 20 and rotate the barrel arm 14 inside the interior area 6 of the holding tank 2 and then fix the position of the barrel 20 and barrel arm 14 by either loosening and pivoting the handle 22 or tightening the handle 22. The barrel engaging mechanism 29, having cinch plate 30 (as best shown in FIGS. 17-18), is utilized to lock the barrel arm 14 in the desired position inside the holding tank 2 by fixing the position of the barrel 20 relative to the valve body 18 when the handle 22 is in its tightened condition 84, as described in FIG. 24. As shown in FIGS. 17-18, the cinch plate 30 has body member 64 with an aperture 66 therethrough, an upper surface 68 and a curved lower surface 70. In one of the preferred configurations, the upper surface 68 is substantially planar and the lower surface 70 is curved with a radius that is slightly less than the radius of the center section of the valve body 18 (i.e., where the groove 48 is located) such that the cinch plate 30 will effectively "ride" slightly above the center groove 48 of the valve body 18 when the handle 22 is in its loosened condition 86, as also described in FIG. 24. In one embodiment, the lower end of the handle 22 (which may be a T-handle) attaches to an enlarged portion 88 of the mounting connector 72, best shown in FIGS. 1-3, 5 and 7-8, that has an outwardly extending engaging portion 90, which in the embodiment shown in the figures is threaded to threadably engages the cooperatively threaded handle aperture 58 of the barrel 20, as best shown in FIG. 8. The enlarged portion 88 of mounting connector 72 is sized and configured to abut the generally planar upper surface 68 of the cinch plate 30 above the aperture 66 thereof with the threaded portion 90 of the mounting connector 72 extending through the cinch plate 30, dust cover 52 and slot 50 and into the handle aperture 58 of the barrel body 39 of barrel 20 to connect (i.e., threadably) to the barrel 20 inside the valve body 18 of the control valve 16. In another embodiment, the handle 22 has an integrally formed enlarged section that is sized and configured to abut the generally planar upper surface 68 of the cinch plate 30 above the aperture 66 with an outwardly extending engaging (i.e., threaded) portion that engages the handle aperture 58 of the barrel 20. During use, when the handle 22 is in its tightened condition 84 the enlarged section 88 of the mounting connector 72 presses tightly against the upper surface 68 of the cinch plate 30 and pulls on the barrel body 39 such that the barrel 20 will abut tightly against the bearings 80 and O-rings 82 inside the valve body 18 to secure the barrel 20 in a particular position and, therefore, prevent rotation of the barrel arm 14 in the interior area 6 of the holding tank 2. When the handle 22 is placed in its loosened condition 86, the cinch plate 30 will be loosely disposed above the valve body 18 and the barrel 20 will be free to rotate inside the valve body 18, at least within the bounds between the ends 51a/51b of the slot 50, to allow the operator to utilize the handle 22 to pivot or rotate the barrel 20 relative to valve body 18 and, therefore, the barrel arm 14 inside the holding tank 2 to position the barrel end opening 24, at the distal end 26 of the barrel arm 14, in holding tank 2 where he or she desires. Once the distal end 26 is where the operator wants the barrel arm opening 24 to be located, he or she will place the handle 22 back in its tightened condition 84 to lock the barrel arm 14 at the desired angle, which positions the barrel end opening 24 where the operator wants to place liquid into or draw liquid from the holding tank 2, as described above.

As set forth above, the barrel positioning mechanism 31 of the racking arm 10 of the present invention comprises a brass pin 32 that is utilized to position the barrel 20 inside the valve body 18 and ensure the racking arm 10 stays together when the handle 22 is separated from the control valve 16 so the barrel arm 14 will not fall into the holding tank 2 when the operator is pumping liquid into the holding tank 2). More specifically, in the embodiment shown in the figures, the barrel positioning mechanism 31 comprises the pin 32 (which is typically made out of brass or the like) being received into locating groove 60 of the barrel 20 in a manner that positions the handle aperture 58 of the barrel 20 in alignment with the slot 50 on the valve body 18. With the bearings 80 and O-rings 82 there will not be any metal-to-metal contact between the barrel 20 and control valve 16.

Figure 5:
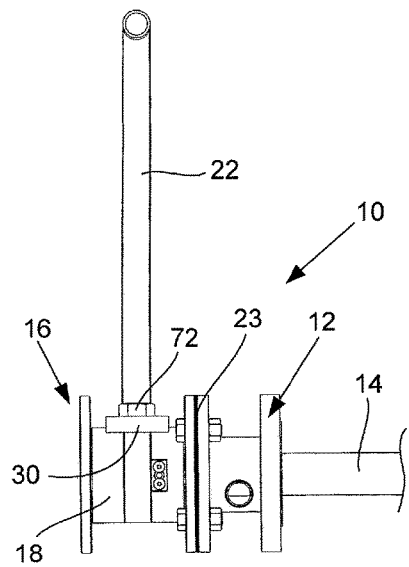
FIG. 5 is a right side view of the racking arm of FIG. 3.
Figure 6:
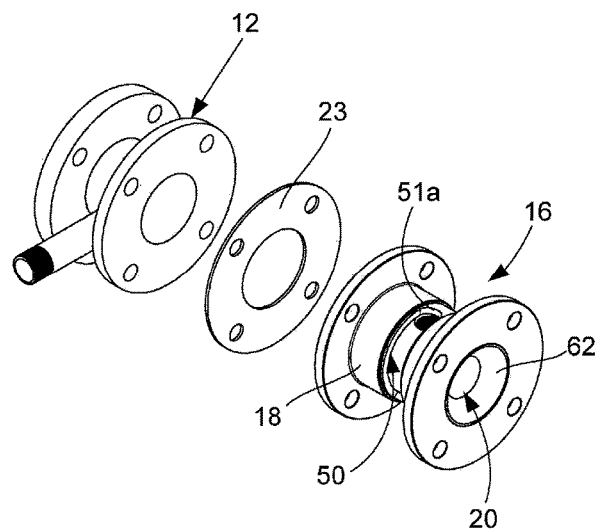
FIG. 6 is a partially exploded side perspective view of the racking arm of FIG. 3, shown without the barrel arm and with the mounting flange rotated 180 degrees, showing the mounting flange and flange seal separate from the control valve.

Although the pin 32 can be made out of a variety of other materials, brass is preferred to provide a brass to stainless steel (the barrel 20 being made out of food grade stainless steel) dissimilar metal contact to prevent galling and the like. As best shown in FIGS. 9-10 and 13, the barrel positioning mechanism 31 also comprises a pin retainer 74 that is secured to the valve body 18 and held in place by one or more (two are shown in the figures) securing elements 76, such as screws, bolts or the like, which are received in cooperatively configured element openings 92, shown in FIGS. 13 and 15, in the valve body 18. A retainer aperture 78 in the pin retainer 74 is sized and configured to allow the user guide the pin 32 into the a pin aperture 94 in the valve body 18 or to position the pin retainer 74 over an outwardly extending, previously positioned pin 32, as shown in FIGS. 13 and 15. Typically, the pin aperture 94 is located between or at least in close proximity to the element openings 92. The pin retainer 74 and securing elements 76 are placed so the lower end of the pin 32 will be positioned in the locating grooves 60 of the barrel 20 and the pin retainer 74 will be mounted on the outer surface of the valve body 18, as shown in FIGS. 5 and 9-10.

In one of the preferred embodiments of the new racking arm 10 of the present invention, the components of the racking arm 10 that will be in contact with the liquid are made from, covered by or coated with materials that will provide a 100% food grade quality racking arm 10. In this embodiment, the racking arm 10 is manufactured with food grade bearings 80 and O-rings 82 that ensure the barrel 20 will rotate inside the valve body 18 and position the barrel arm 14 where desired (i.e., in one use, commonly referred to as "racking the wine"). The new racking arm 10 will not leak and will allow the operator to place the barrel arm opening 24 at the distal end 26 of barrel arm 14 where it is most beneficial for what he or she is attempting to accomplish. Inside the holding tank 2, the barrel arm 14 will have the full range of motion provided by the length of the slot 50 in the valve body 18, such as 135 degrees (in one example). In addition, the new racking arm 10 can be utilized as a left hand or right hand racking arm without modification. The use of the brass pin 32 ensures there is no stainless steel on steel contact. As will be readily appreciated by persons who are skilled in the relevant art, the new racking arm 10 will allow the user to rotate or pivot the barrel arm 14 inside of the holding tank 2 while the remaining components, except the handle 22, on the outside of the holding tank 2 remain stationary (i.e., namely the mounting flange 12, valve body 18, exterior flow pipe 63 and operating valve 27). This will also allow any other valves, piping or other components that are attached to the racking arm 10 outside of the holding tank 2 to remain in a fixed or stationary position.

Figure 24:
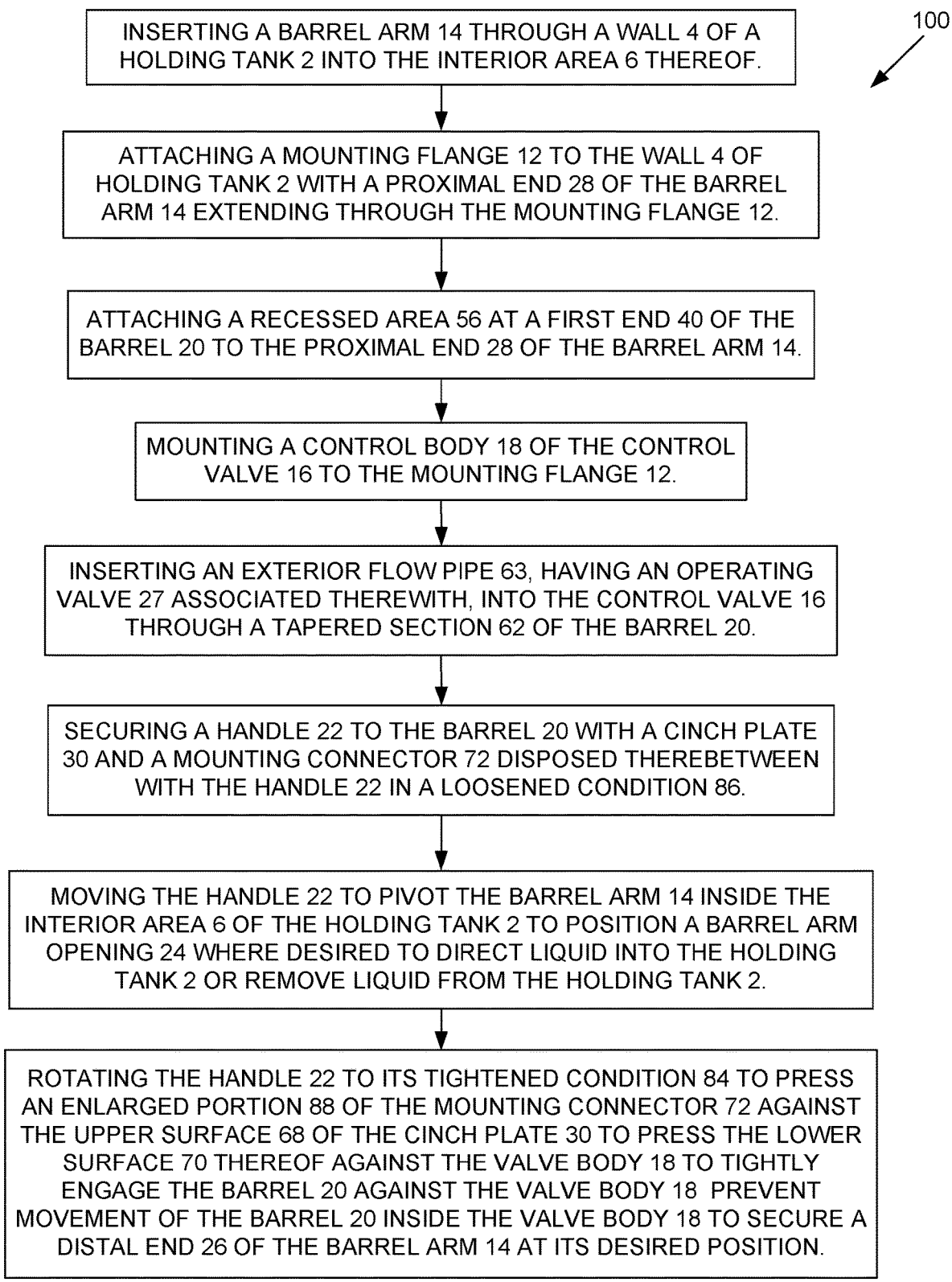
FIG. 24 is a chart showing a method of installing and utilizing the racking arm of the present invention with a holding tank.

A method 100 of using the racking arm 10 of the present invention is shown in the chart of FIG. 24. As set forth in FIG. 24, one method of utilizing the racking arm 10 comprises the steps of: (1) inserting the distal end 26 of the barrel arm 14 through an aperture in a wall 4 of a holding tank 2 into the interior area 6 thereof; (2) attaching the mounting flange 12 to the wall 4 of holding tank 2 over the aperture in the wall 4 with the proximal end 28 of the barrel arm 14 extending through the mounting flange 12 using tank connectors 8 with the mounting seal 13 between the flange 12 and the wall 4; (3) attaching the recessed area 56 at the first end 40 of the barrel 20 to the proximal end 28 of the barrel arm 14; (4) mounting control body 18 of the control valve 16 to the mounting flange 12; (5) inserting the exterior flow pipe 63, having an operating valve 27 associated therewith, into the control valve 16 through the tapered section 62 at the second end 42 of the barrel body 39 of the barrel 20; (6) securing the handle 22 to the handle aperture 58 of the barrel 20 with the cinch plate 30 and mounting connector 72 being disposed therebetween and with the handle 22 in its loosened condition 86; (7) moving the handle 22 to pivot the barrel arm 14 inside the interior area 6 of the holding tank 2 to position the barrel arm opening 24 where desired to direct liquid into the holding tank 2 or remove liquid from the holding tank 2; and (8) rotating the handle 22 to its tightened condition 84 to press the enlarged portion 88 of the mounting connector 72 against the upper surface 68 of the cinch plate 30 to press the lower surface 70 of the cinch plate 30 against the valve body 18 above the slot 50 to tightly engage the bearings 80 and O-rings 82 on the barrel 20 against the interior wall of the valve body 18 to prevent movement of the barrel 20 inside the valve body 18 and secure the distal end 26 of the barrel arm 14 at its desired position. As will be readily appreciated by persons skilled in the art, one or more of the steps set forth above may be taken in a different order, combined together to be performed in a single step, eliminated and/or added. For instance, it may be beneficial to connect the barrel 20 to the proximal end 28 of the barrel arm 14, if not integrally formed therewith, prior to inserting the distal end 26 of the barrel arm 14 into the interior area 6 of holding tank 2. In other circumstances, it may be beneficial to connect the racking arm 10, mounting flange 12, exterior flow pipe 63 and operating valve 27 together prior to placing the distal end 26 of the barrel arm 14 inside the interior area 6 of the holding tank 2. Other modifications to method 100 are also possible.

One of the advantages of the racking arm 10 of the present invention is the fact that the racking arm 10 can be utilized as a left or right hand racking arm 10. Because the pin 32 and pin retainer 74 are toward an end 40/42 of the valve body 18 relative to the centrally disposed handle 22, if the pin 32 and retainer 74 are to the left of the handle 22, then the racking arm 10 is a right hand racking arm, whereas if the pin 32 and retainer 74 are to the right of the handle 22, then the racking arm 10 is a left hand racking arm 10. When placing the barrel 20 inside the valve body 18, it is very important to lubricate and install both bearings 80 in their respective bearing grooves 46 of the valve body 18, lubricate and install the front O-ring 82 in its O-ring groove 44, which is the O-ring groove 44 toward the second end 38 of the valve body 18, very carefully and gently slide the barrel 20 into the valve body 18 from the first end 36 of the valve body 18 (i.e., the side without the O-ring 82) to expose the O-ring groove 44 toward the first end 36 of the valve body 18 (i.e., with the second end 42 of the barrel 20 beyond the second end 38 of the valve body 18, lubricate and install the second O-ring 82 into the O-ring groove 44 and then slide the barrel 20 back toward the first end 36 of the valve body until the barrel 20 is flush with both ends 36/38 of the valve body 18.

Once the barrel 20 is in place, the user inserts the pin 32 (which may be a brass pin) into the pin aperture 94, positions the pin retainer 74 in place over the pin 32 and then secures the pin retainer 74 to the valve body 18 with securing elements 76. The user will need to select lubricants that are appropriate for the materials which are utilized for the bearings 80 and O-rings 82 and it may be preferred to utilize Loctite® or the like with the securing elements 76. After the barrel 20 has been installed, the user will snap on the dust cover 52, which may be a nylon band, over the groove 48 in the valve body 18, align the aperture 54 of the dust cover 52 with the handle aperture 58 of the barrel 20, position the lower surface 70 of the cinch plate 30 on the valve body 18 over the apertures 54/58 of the dust cover 52 and barrel 20, thread the threaded portion 90 of the mounting connector 72 into the handle aperture 58 of the barrel 20, place the lower end of the handle 22 over the enlarged portion 88 of the mounting connector 72 and then rotate the handle 22 until the cinch plate 30 is pressed tightly against the valve body 18, which will prevent the barrel 20 from rotating inside the valve body 18 and, therefore, prevent the barrel arm 14 from rotating inside the interior area 6 of the holding tank 2. The user will need to be careful not to over-torque the handle 22, which could damage the control valve 16. With the control valve 16 put together and the distal end 26 of the barrel arm 14 disposed inside the interior area 6 of the holding tank 2, the user connects the control valve 16 to the mounting flange 12, with the flange seal 23 therebetween, and attaches the mounting flange 12 to the wall 4 of the holding tank 2, with the mounting seal/gasket 13 therebetween. Once installed, the racking arm 10 is ready for the user/operator of the holding tank 2 to move the barrel arm opening 24 at the location where he or she desires to place liquid into the holding tank 2 or remove liquid from the holding tank 2 without mixing or otherwise disturbing any solids at the bottom of the holding tank 2, and/or to mix or circulate liquid in the holding tank 2 through barrel arm 14.

While there are shown and described herein specific forms of the invention, it will be readily apparent to those skilled in the art that the invention is not so limited, but is susceptible to various modifications and rearrangements in design and materials without departing from the spirit and scope of the invention. In particular, it should be noted that the present invention is subject to modification with regard to any dimensional relationships set forth herein and modifications in assembly, materials, size, shape and use. For instance, there may be numerous components of the embodiments described herein that can be readily replaced with equivalent functioning components to accomplish the objectives and obtain the desired aspects of the present invention. The various embodiments set forth herein are intended to explain the best mode of making and using the present invention as currently known to and appreciated by the present inventor(s) and to enable other persons who are skilled in the relevant art to make and utilize the present invention. Although, the described embodiments may comprise different features, not all of these features are required in all embodiments of the present invention. More specifically, as will be readily appreciated by persons who are skilled in the art, certain embodiments of the present invention only utilize some of the features and/or combinations of features disclosed herein.

What is claimed is:

1. A racking arm for use with a holding tank having a wall defining an interior area of the holding tank, said racking arm comprising:

an elongated barrel arm having a distal end structured and arranged to be placed through the wall into the interior area of the holding tank, a proximal end to be positioned outside the holding tank and a barrel arm opening at or near said distal end of said elongated barrel arm; and a control valve having a tubular valve body, a tubular barrel rotatably disposed in said valve body and a handle attached to said tubular barrel, said valve body having a first end, a second end and a slot through said valve body between said first end and said second end thereof, said tubular barrel having a barrel body defining a first end and a second end of said tubular barrel, said proximal end of said elongated barrel arm attached to or integral with said first end of said tubular barrel, said barrel body defining a flow channel between said first end and said second end of said tubular barrel that is in fluid flow communication with said barrel arm opening, said valve body and said barrel body being cooperatively structured and arrange to sealably allow rotation of said tubular barrel in said valve body, said handle disposed through said slot to rotate said tubular barrel inside said valve body upon movement of said handle along said slot, wherein rotation of said tubular barrel by said handle will rotate said distal end of said elongated barrel arm to selectively position said barrel arm opening in the interior area of the holding tank.

2. The racking arm of claim 1 further comprising a bearing groove in an inner surface of said valve body, an O-ring groove in said inner surface of said valve body, said bearing groove retaining a bearing, said O-ring groove retaining an O-ring, said barrel body of said tubular barrel being rotatably positioned inside said valve body with each of said bearing and said O-ring being disposed between said valve body and said barrel body to sealably allow rotation of said tubular barrel relative to said valve body.

3. The racking arm of claim 2, wherein said control valve comprises one of said bearing groove and one of said O-ring groove at or near each of said first end and said second end of said valve body, each of said bearing grooves retaining one of said bearings and each of said O-ring grooves retaining one of said O-rings, each of said bearings and each of said O-rings disposed between said valve body and said tubular barrel to sealably allow said tubular barrel to rotate relative to said valve body.

4. The racking arm of claim 1 further comprising a barrel positioning means associated with said valve body and said tubular barrel for rotatably positioning said tubular barrel in said valve body and to selectively prevent said tubular barrel from moving out of said valve body.

5. The racking arm of claim 4, wherein said barrel positioning means comprises a pin aperture disposed through said valve body, a locating groove on said barrel body of said tubular barrel and a pin sized and configured to fit through said pin aperture and into said locating groove, said locating groove and said pin aperture being cooperatively positioned for said locating groove to be in alignment with said pin aperture such that when said pin is disposed through said pin aperture said pin will engage said locating groove.

6. The racking arm of claim 5 further comprising a pin retainer mounted to an outer surface of said valve body at said pin aperture, said pin retainer having a retainer aperture aligned with said pin aperture such that said pin is received through each of said retainer aperture and said pin aperture and into said locating groove of said tubular barrel.

7. The racking arm of claim 1, wherein said valve body of said control valve is attached to or integral with a mounting flange, the mounting flange being integral with or attached to the wall of the holding tank.

8. The racking arm of claim 7, wherein said valve body of said control valve is structured and arranged to be removably attached to said mounting flange so as to removably secure said racking arm to the holding tank with said distal end of said elongated barrel arm disposed in the interior area of the holding tank.

9. The racking arm of claim 1 further comprising a dust cover slidably received in a groove disposed on an outer surface of said valve body, said slot positioned in said groove so as to be covered by said dust cover, said dust cover having an aperture through which said handle is positioned so as to allow said handle to attach to said tubular barrel and to move between a first end and second end of said slot so as to rotate said tubular barrel.

10. The racking arm of claim 1, wherein said second end of said barrel body has a tapered section in fluid flow communication with said flow channel, said tapered section being sized and configured to receive at least one of an exterior flow pipe and an operating valve.

11. The racking arm of claim 1 further comprising a barrel engaging means associated with each of said valve body, said tubular barrel and said handle for engaging said tubular barrel in said valve body to prevent or allow rotation of said tubular barrel in said valve body so as to allow or prevent movement of said distal end of said elongated barrel arm in the interior area of the holding tank.

12. The racking arm of claim 11, wherein said barrel engaging means is structured and arranged to selectively place said handle in a loosened condition to allow movement of said handle in said slot and rotation of said tubular barrel in said valve body so as to move said barrel arm opening in the interior area of the holding tank and a tightened condition preventing movement of said handle in said slot and rotation of said tubular barrel in said valve body so as to fix the position of said barrel arm opening in the interior area of the holding tank.

13. The racking arm of claim 12, wherein said barrel engaging means comprises a cinch plate having an aperture therethrough, a mounting connector attached to or integral with said handle and a handle aperture in said barrel body in alignment with said slot of said valve body, said mounting connector having an enlarged portion and an engaging portion, said enlarged portion configured to engage an upper surface of said cinch plate and press a lower surface of said cinch plate against said valve body to place said handle in said tightened condition, said engaging portion structured and arranged to be received through said aperture of said cinch plate and said slot of said valve body to engage said handle aperture of said tubular barrel so as to rotate said tubular barrel when said handle is in said loosened condition and to prevent rotation of said tubular barrel when said handle is in said tightened condition.

14. A racking arm for use with a holding tank having a wall defining an interior area of the holding tank, said racking arm comprising:

an elongated barrel arm having a distal end structured and arranged to be placed through the wall into the interior area of the holding tank, a proximal end to be positioned outside the holding tank and a barrel arm opening at or near said distal end of said elongated barrel arm; and a control valve having a tubular valve body, a tubular barrel rotatably disposed in said valve body, a handle attached to said tubular barrel, a bearing, an O-ring and a pin, said valve body having a first end, a second end, a bearing groove in an inner surface of said valve body, an O-ring groove in said inner surface of said valve body, an elongated slot through said valve body and a pin aperture through said valve body, said bearing groove retaining said bearing, said O-ring groove retaining said O-ring, said tubular barrel having a barrel body rotatably positioned inside said valve body with each of said bearing and said O-ring being disposed between said valve body and said barrel body to sealably allow rotation of said tubular barrel in said valve body, said barrel body defining a first end and a second end of said tubular barrel, said barrel body defining a flow channel between said first end and said second end of said tubular barrel in fluid flow communication with said barrel arm opening, said barrel body having a locating groove in alignment with said pin aperture, said handle disposed through said slot so as to rotate said tubular barrel inside said valve body upon movement of said handle along said slot between a first end and a second end thereof, said pin received through said pin aperture into said locating groove to position said tubular barrel in said valve body, said proximal end of said elongated barrel arm integral with or attached to said first end of said tubular barrel such that rotation of said tubular barrel by said handle will rotate said distal end of said elongated barrel arm so as to selectively position said barrel arm opening in the interior area of the holding tank.

15. The racking arm of claim 14, wherein said control valve comprises one of said bearing groove and one of said O-ring groove at or near each of said first end and said second end of said valve body, each of said bearing grooves retaining one of said bearings and each of said O-ring grooves retaining one of said O-rings, each of said bearings and each of said O-rings disposed between said valve body and said tubular barrel to sealably allow said tubular barrel to rotate relative to said valve body.

16. The racking arm of claim 14 further comprising a pin retainer mounted to an outer surface of said valve body at said pin aperture, said pin retainer having a retainer aperture aligned with said pin aperture such that said pin is received through each of said retainer aperture and said pin aperture and into said locating groove of said tubular barrel.

17. The racking arm of claim 14 further comprising a barrel engaging means associated with each of said valve body, said tubular barrel and said handle for engaging said tubular barrel in said valve body, said barrel engaging means structured and arranged to selectively place said handle in a loosened condition which allows movement of said handle in said slot to rotate said tubular barrel in said valve body so as to move said barrel arm opening in the interior area of the holding tank and a tightened condition which prevents movement of said handle in said slot and rotation of said tubular barrel in said valve body so as to fix the position of said barrel arm opening in the interior area of the holding tank.

18. The racking arm of claim 17, wherein said barrel engaging means comprises a cinch plate having an aperture therethrough, a mounting connector attached to or integral with said handle and a handle aperture in said barrel body in alignment with said slot of said valve body, said mounting connector having an enlarged portion and an engaging portion, said enlarged portion configured to engage an upper surface of said cinch plate and press a lower surface of said cinch plate against said valve body to place said handle in said tightened condition, said engaging portion structured and arranged to be received through said aperture of said cinch plate and said slot of said valve body to engage said handle aperture of said tubular barrel so as to rotate said tubular barrel when said handle is in said loosened condition and to prevent rotation of said tubular barrel when said handle is in said tightened condition.

19. A racking arm for use with a holding tank having a wall defining an interior area of the holding tank, said racking arm comprising:
an elongated barrel arm having a distal end structured and arranged to be placed through the wall into the interior area of the holding tank, a proximal end to be positioned outside the holding tank and a barrel arm opening at or near said distal end of said elongated barrel arm; and
a control valve having a tubular valve body having a first end and a second end, a tubular barrel rotatably disposed in said valve body between said first end and said second thereof, a handle attached to said tubular barrel, a pin, a bearing retained in a bearing groove in an inner surface of said valve body at or near each of said first end and said second end of said valve body and an O-ring retained in an O-ring groove in said inner surface of said valve body at or near each of said first end and said second end of said valve body, said valve body having an elongated slot and a pin aperture through said valve body, said tubular barrel having a barrel body rotatably positioned inside said valve body with each of said bearings and said O-rings being disposed between said valve body and said barrel body to sealably allow rotation of said tubular barrel in said valve body, said barrel body defining a first end and a second end of said tubular barrel, said barrel body defining a flow channel between said first end and said second end of said tubular barrel which is in fluid flow communication with said barrel arm opening, said barrel body having a locating groove in alignment with said pin aperture and a handle aperture in alignment with said slot, said handle disposed through said slot and connected to said handle aperture so as to rotate said tubular barrel inside said valve body upon movement of said handle along said slot between a first end and a second end thereof, said pin received through said pin aperture into said locating groove to position said tubular barrel in said valve body, said proximal end of said elongated barrel arm integral with or attached to said first end of said tubular barrel such that rotation of said tubular barrel by said handle will rotate said distal end of said elongated barrel arm so as to selectively position said barrel arm opening in the interior area of the holding tank.

20. The racking arm of claim 19 further comprising a barrel engaging means associated with each of said valve body, said tubular barrel and said handle for engaging said tubular barrel in said valve body to prevent or allow rotation of said tubular barrel in said valve body so as to allow or prevent movement of said distal end of said elongated barrel arm in the interior area of the holding tank, said barrel engaging means comprising a cinch plate having an aperture therethrough, a mounting connector attached to or integral with said handle and a handle aperture in said barrel body in alignment with said slot of said valve body, said mounting connector having an enlarged portion and an engaging portion, said enlarged portion configured to engage an upper surface of said cinch plate and press a lower surface of said cinch plate against said valve body to place said handle in a tightened condition, said engaging portion structured and arranged to be received through said aperture of said cinch plate and said slot of said valve body to engage said handle aperture of said tubular barrel so as to rotate said tubular barrel when said handle is in a loosened condition and to prevent rotation of said tubular barrel when said handle is in said tightened condition.

\* \* \* \* \*